F. J. TONE.
METHOD OF TREATING EMERY ORE.
APPLICATION FILED NOV. 14, 1908.
1,002,608.
Patented Sept. 5, 1911.
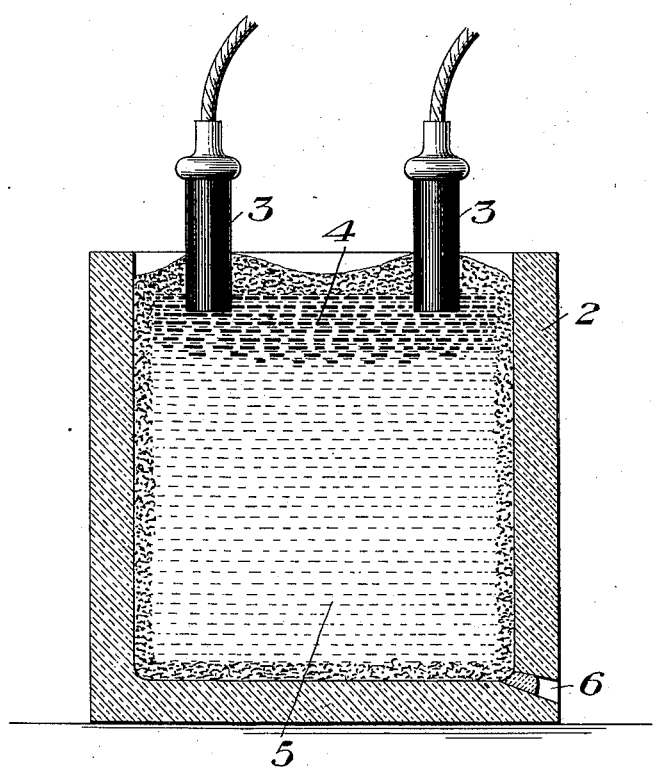
WITNESSES
INVENTOR

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF TREATING EMERY ORE.

1,002,608.  Specification of Letters Patent.  Patented Sept. 5, 1911.

Application filed November 14, 1908. Serial No. 462,609.

*To all whom it may concern:*

Be it known that I, FRANK J. TONE, of Niagara Falls, in Niagara county and State of New York, have invented a new and useful Method of Treating Emery Ore, of which the following is a full, clear, and exact description, reference being had to the accompanying drawing, forming part of this specification, in which the figure is a longitudinal section showing one form of furnace for carrying out my invention.

My invention relates to the treating and purifying of emery ore. This ore is a natural one, consisting principally of alumina, but is always associated with impurities such as iron oxid, and usually silica, and often small quantities of titanium oxid and other impurities. These should be removed in order to convert the ore into a product consisting substantially of pure alumina, since this possesses increased hardness and greater abrasive qualities.

My improved process consists in a new mode of applying electric heat in connection with the use of sufficient carbonaceous material to reduce the impurities, this carbon being insufficient in quantity to reduce the alumina to a temperature below the reduction temperature of alumina and above the reduction temperature of silica.

In carrying out my process in its preferred form, a mixture is made of pulverized emery and carbon, the carbon being present to an amount sufficient to reduce all the oxids other than alumina but insufficient to reduce the alumina. The mass of mixture is then placed between the electrode terminals of an electric furnace, and current is passed through the same. As the heating of the mass progresses, and it becomes partially fused, its conductivity increases, and when it reaches a well-fused condition the charge will become a good conductor of electricity. The current in passing through this mixture generates heat, and the furnace operates as a simple resistance furnace, the resistance conductor being the fused charge.

In the drawing, 2 represents a receptacle, preferably made of refractory material to contain the charge, and 3, 3 are the electrode terminals connected with a source of electric current and depending in the furnace chamber at separated points. The lower ends of the electrodes make contact with the mass of mixture 4, which is undergoing fusion, and is also in the process of reduction.

5 represents the finished product completely fused, consisting of practically pure alumina with globules of the metallic reduction product consisting of iron, silicon and titanium mixed and agglomerated therewith. By a practically pure alumina I mean a product which may still contain minor impurities in amounts of a few per cent. It is difficult to so proportion the carbon as to remove all of the impurities and still not reduce any alumina. It is important to carefully avoid reducing any alumina, for in this case an entirely different product is obtained and one that is very friable, easily pulverized and not having properties making it a good abrasive.

The charge mixture 4 is supplied from time to time around and between the electrodes as it becomes reduced. I have found that the layer of fused and purified alumina 5 is a poor conductor of the current, and that this current confines itself practically to the impure alumina shown in the layer 4 which is undergoing reduction. Thus the distribution of current is self-adjusting, the major portion giving the proper heating effect where the most heat is required, allowing the purified product to cool very gradually and thus promoting crystallization in a most favorable manner. The electrodes are raised from time to time, as the column of purified product builds up, and as the zone of fusion and reduction automatically raises itself above the purified layer and into the fresh charge. There is thus formed an ingot of the finished product to any height desired. The reduction and fusion zone follows the elevation of the electrodes, and in this way the process is practically continuous. When an ingot of sufficient size has been formed the operation is stopped and the ingot is allowed to cool. It is then broken up and crushed and the alumina separated from the metallic reduction product by concentration or other well known methods. If desired, instead of allowing the reduced metal to cool with the alumina, portions of the metallic reduction product which settle to the bottom of the furnace and remain in a fused condition may be tapped from time to time from the furnace through a suitable tap hole as shown at 6.

My invention presents many advantages over the arc method of heating, since a more moderate heat may be employed and the temperature is regulated so as to reduce the iron silica and other impurities without attacking the alumina. When a charge of this character is submitted to the full heat of an electric arc it is impossible to reduce the iron and silica without also reducing a considerable portion of alumina; and this disadvantage is obviated by my method. The method is of further great advantage in that the furnace may be operated continuously with automatic and inherent regulation of the heat distribution and of the reduction and fusion zones. The treatment of the fused alumina may also be carried out in such a way as to obtain the most desirable properties in the finished product.

The alumina which I obtain in this process has many valuable commercial uses. It has great hardness and abrasive qualities, making it useful in the manufacture of grinding wheels where emery and corundum have previously been used. It may be used for the further manufacture of aluminum compounds. It is very refractory and may be used in fire brick, especially for basic linings. The alloys of iron, silicon and titanium which are formed as reduction products in this process may also be used in the metallurgy of iron and steel.

I claim:—

1. The process of treating emery ore, which consists in forming a mixture of pulverized ore with an amount of carbon sufficient to reduce the constituents of the ore other than alumina, and insufficient to reduce the alumina, interposing this mixture as a resistance conductor between electrodes and passing current through the same at a temperature below the reduction temperature of alumina, and above the reduction temperature of silica, allowing the fused mass to cool and separating the reduction products from the fused alumina, substantially as described.

2. The process of treating emery ore, which consists in forming a mixture of pulverized ore with an amount of carbon sufficient to reduce the constituents of the ore other than alumina and insufficient to reduce the alumina, interposing the mixture as a resistance conductor between electrodes and passing current through the same at a temperature below the reduction temperature of alumina and above the reduction temperature of silica, allowing the progressive elevation of the zone of fusion and reduction and a building up of an ingot of fused alumina and supplying fresh charge mixture from time to time, substantially as described.

In testimony whereof, I have hereunto set my hand.

FRANK J. TONE.

Witnesses:
ORLANDO B. WILMER,
F. I. PIERCE.